United States Patent
Prem Chand et al.

(10) Patent No.: US 9,898,325 B2
(45) Date of Patent: Feb. 20, 2018

(54) CONFIGURATION SETTINGS FOR CONFIGURABLE VIRTUAL COMPONENTS

(71) Applicant: VMWARE, INC., Palo Alto, CA (US)

(72) Inventors: Avakash Prem Chand, Bangalore (IN); Clement Jebakumar, Bangalore (IN); Akash Kodenkiri, Bangalore (IN); Shubha B S, Raichur (IN); Ramesh Vepuri Lakshminarayana, Bangalore (IN); Kavya Reddy Musani, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 59 days.

(21) Appl. No.: 15/046,475

(22) Filed: Feb. 18, 2016

(65) Prior Publication Data

US 2017/0109188 A1 Apr. 20, 2017

(30) Foreign Application Priority Data

Oct. 20, 2015 (IN) .......................... 5651/CHE/2015

(51) Int. Cl.
*G06F 9/455* (2006.01)
*G06F 9/445* (2018.01)

(52) U.S. Cl.
CPC ...... *G06F 9/45558* (2013.01); *G06F 9/44505* (2013.01); *G06F 9/45533* (2013.01); *G06F 2009/4557* (2013.01)

(58) Field of Classification Search
CPC ................................................. G06F 9/45533
USPC .......................................................... 718/1
See application file for complete search history.

(56) References Cited

U.S. PATENT DOCUMENTS

| | | | |
|---|---|---|---|
| 6,981,250 B1 | 12/2005 | Wiltamuth et al. | |
| 8,370,819 B2* | 2/2013 | Chakraborty | G06F 8/63 703/27 |
| 8,799,709 B2* | 8/2014 | Iikura | G06F 11/1415 714/19 |
| 8,832,029 B2* | 9/2014 | Bezbaruah | G06F 9/45558 707/646 |
| 8,938,489 B2* | 1/2015 | Suit | H04L 12/6418 709/202 |
| 9,665,378 B2* | 5/2017 | Warkentin | G06F 9/4401 |
| 2006/0184937 A1* | 8/2006 | Abels | G06F 8/65 718/1 |
| 2009/0094603 A1* | 4/2009 | Hiltgen | G06F 9/4406 718/1 |
| 2009/0158295 A1* | 6/2009 | Burg | G06F 11/1438 718/108 |

(Continued)

OTHER PUBLICATIONS

Pfaff, et al., "Virtualization Aware File Systems: Getting Beyond the Limitations of Virtual Disks" Stanford University Department of Computer Science, NSDI: 3rd Symposium on Networked Systems Design & Implementation (2006) (14 pgs).

*Primary Examiner* — Mehran Kamran

(57) ABSTRACT

The present disclosure is related to systems, methods, and non-transitory machine readable media for virtual component revision. An example non-transitory machine readable medium can store instructions executable by a processing resource to cause a computing system to store a change to a configuration setting among a plurality of configuration settings each associated with a configurable virtual component and store the plurality of configuration settings associated with the configurable virtual component.

15 Claims, 3 Drawing Sheets

(56) References Cited

U.S. PATENT DOCUMENTS

| | | | |
|---|---|---|---|
| 2009/0249284 A1* | 10/2009 | Antosz | G06F 8/10 717/104 |
| 2010/0100880 A1* | 4/2010 | Shigeta | H04L 12/6418 718/1 |
| 2010/0100881 A1* | 4/2010 | Shigeta | G06F 11/2247 718/1 |
| 2010/0115342 A1* | 5/2010 | Shigeta | G06F 11/3688 714/37 |
| 2011/0225275 A1* | 9/2011 | Shah | G06F 9/44505 709/223 |
| 2011/0238820 A1* | 9/2011 | Matsuoka | G06F 9/5077 709/224 |
| 2012/0084521 A1* | 4/2012 | Fukui | G06F 11/1438 711/162 |
| 2012/0096065 A1* | 4/2012 | Suit | H04L 12/6418 709/202 |
| 2012/0131309 A1* | 5/2012 | Johnson | G06F 9/30 712/41 |
| 2012/0151480 A1* | 6/2012 | Diehl | G06F 9/461 718/1 |
| 2013/0179736 A1* | 7/2013 | Gschwind | G06F 11/3075 714/37 |
| 2013/0239106 A1* | 9/2013 | Srinivasan | G06F 9/45558 718/1 |
| 2013/0263114 A1* | 10/2013 | Watkins | G06F 9/45558 718/1 |
| 2013/0283273 A1* | 10/2013 | Miyazaki | G06F 9/45533 718/1 |
| 2013/0290986 A1* | 10/2013 | Kobayashi | G06F 3/01 719/318 |
| 2014/0297597 A1* | 10/2014 | Matsubara | G06F 9/461 707/681 |
| 2014/0297774 A1* | 10/2014 | Munupalle | H04L 41/082 709/208 |
| 2014/0331226 A1* | 11/2014 | Arcese | G06F 9/45533 718/1 |
| 2015/0113530 A1* | 4/2015 | Arcese | G06F 9/45558 718/1 |
| 2015/0138979 A1* | 5/2015 | Iijima | H04L 45/74 370/235 |

* cited by examiner

CONFIGURATION SETTINGS FOR CONFIGURABLE VIRTUAL COMPONENTS

RELATED APPLICATIONS

Benefit is claimed under 35 U.S.C. 119(a)-(d) to application Serial No. 5651/CHE/2015 filed in India entitled "CONFIGURATION SETTINGS FOR CONFIGURABLE VIRTUAL COMPONENTS", on Oct. 20, 2015, by VMware, Inc. which is herein incorporated in its entirety by reference for all purposes.

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed, on a hypervisor provisioned with a pool of computing resources (e.g., processing resources, memory resources, etc.).

DETAILED DESCRIPTION

Figure 1:
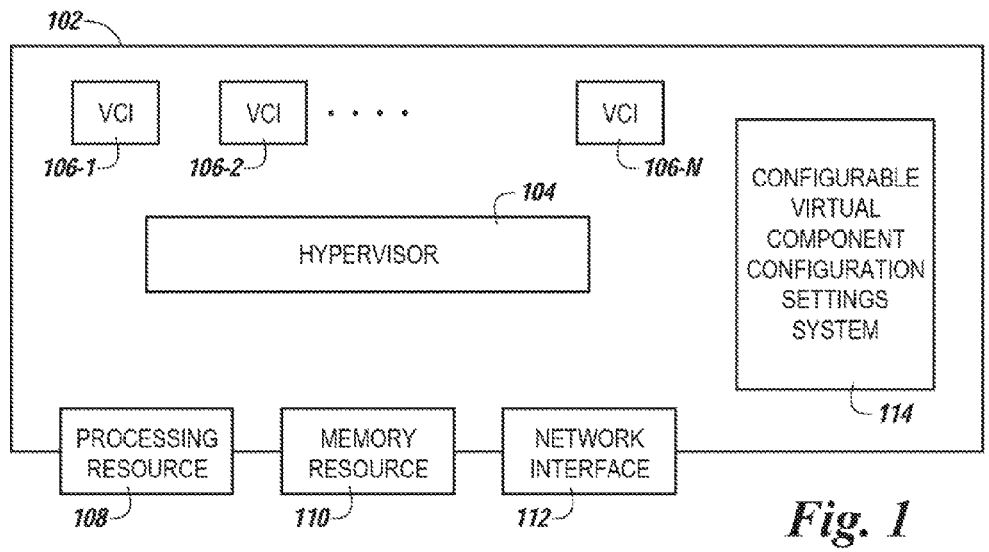
FIG. 1 is a diagram of a host with configuration settings for configurable virtual components according to the present disclosure.

The term "virtual computing instance" (VCI) covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated user space instance, which can be executed within a virtualized environment. Other technologies aside from hardware virtualization can provide isolated user space instances, also referred to as VCIs. The term "VCI" covers these examples and combinations of different types of VCIs, among others.

VMs, in some embodiments, operate with then own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

Multiple VCIs can be configured to be in communication with each other in a distributed computing system (e.g., a software defined data network). Such a system can include various configurable components, for example, configurable virtual components. A virtual component is a component of a system (e.g., a distributed computing system) that is defined virtually (e.g., via executable instructions) and provisioned physically (e.g., via processor and/or memory resources, etc.). As used herein, "configurable virtual components" include virtual components that are configurable via executable instructions to setup, change, and/or maintain the infrastructure of a distributed computing system. Some examples of configurable virtual components include portgroups, desktop virtualization solutions (DVS), resource pools, VM containers for multiple VMs (e.g., vAPP), virtual infrastructure resource management components (e.g., VCD), and/or other VM objects. In some embodiments, configurable virtual components can include a combination of software and/or hardware (e.g., a pool of computing resources), but at least include hardware configured to perform operations, control, or otherwise manipulate the infrastructure of a distributed computing system.

A distributed computing system can include thousands of configurable virtual components, such as VCIs, which can be associated with a plurality of data centers. In addition to examples described above, other examples of configurable virtual components include virtual storage adapters, virtual network interface controllers (NICs), virtual switches, portgroups, profiles, roles, permissions, etc. The distributed computing system architecture can be managed by one or more administrators, which can lead to configuration setting changes being obfuscated to the user. As used herein, a "configuration setting" is an arrangement of resources assigned to various configurable virtual components in a distributed computing system.

A user may have difficulty in discovering a change made by an administrator to a configuration setting of a configurable virtual component. Further, in some cases, a user or administrator may, either by design or by accident, make changes to a configuration setting of one or more configurable virtual components that can cause a network outage, or a user or administrator may choose to restore settings of one or more configurable virtual components to their default or original configuration setting. These actions can cause problems in a distributed computing system that can, under some previous approaches, be difficult to remedy. As used herein, a "user" is a person who has access exclusively to one or more VCIs, while an "administrator," as used herein, is a person who has access to change configuration settings for VCIs, configurable virtual components, and other objects in a distributed computing system. For example, a user can power on, power off, and/or reset one or more VCIs, while an administrator can change configuration settings for one or more VCIs. and/or add or remove one or more VCIs.

In a distributed computing system, a user or an administrator may make changes to the infrastructure of the distributed computing system by causing a configuration setting associated with one or more configurable virtual components to be changed. For example, a user or administrator may wish to add or remove VCIs from a VM container, and/or may wish to change the allocation of a pool of computing resources among different VCIs. It may be beneficial to record these changes and/or provide versioning to one or more components that can be subject to changes; however, some previous approaches to configuration settings for configurable virtual components can suffer from a number of shortcomings.

For example, in some previous approaches, if the user or administrator would like to revert to a previous configuration setting of a configurable virtual component and/or distributed computing system infrastructure, it can be difficult or sometimes impossible to know what changes have been made and therefore what changes can be made to revert to the previous configuration setting of the configurable virtual component and/or the distributed computing system infrastructure. These shortcomings can lead to situations where reverting to a previous configuration setting of a configurable virtual component and/or distributed computing system architecture becomes complicated and potentially unfeasible, for example in a case where an administrator, either by accident or by design, changes allocation of a resource pool associated with a distributed computing system such that VCIs in the system are under-provisioned and susceptible to failure.

As VCIs become increasingly popular and widespread, it can become beneficial to provide revisions to the configuration settings of configurable virtual components and/or distributed computing systems. This can be relevant to both service providers and customers. For example, it can be beneficial for customers who consume virtual computing services and/or service providers who provide virtual computing services and/or distributed computing systems. Advantageously, embodiments described herein allow for revisions to the configuration settings of configurable virtual components and/or distributed computing systems. For example, embodiments described herein can provide versioning for configuration settings of configurable virtual components and/or distributed computing systems at the component level (e.g., versioning can be provided for the configuration settings of up to every configurable virtual component in a distributed computing system), among other benefits. In some embodiments, revisions (e.g., providing versioning for the configuration settings of configurable virtual components) can use less computing resources and/or can use less storage space than a snapshot approach to storing and reverting to previous configuration settings, for example. In this regard, revisions to configurable virtual components and/or a distributed computing system can be stored more frequently than snapshots and can therefore be used to provide versioning to configurable virtual components and/or a distributed computing system architecture for revisions made since a previous snapshot was taken and/or without taking a new snapshot.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

Embodiments of the present disclosure are directed to configurable virtual component revision, for example, in the context of a distributed computing system including one or more VCIs. As used herein, a "revision" is an incrementally different version of electronic information. For example, a revision can include discrete configuration changes made to the configuration setting of a configurable virtual component. By storing and/or keeping track of revisions made to the configurable virtual components, embodiments of the present disclosure can facilitate versioning of the configurable virtual components and/or VCIs in a distributed computing system.

In at least one embodiment, revisions made to configurable virtual components can be recorded and/or stored to provide versioning to up to every VCI and/or configurable virtual component in a distributed computing system. In some embodiments, a particular number N of revisions for each VCI and/or configurable virtual component in a distributed computing system can be recorded and/or stored. For example, five revisions for each VCI and/or configurable virtual component in a distributed computing system can be recorded and/or stored, in this example, the five most recent revisions to configuration settings made to each VCI and/or configurable virtual component in a distributed computing system architecture can retained. Embodiments are not so limited however, and the number N of revisions can be any non-zero, positive integer.

In at least one embodiment, the stored revisions can be used to restore the configuration setting of one or more of the VCIs and/or configurable virtual components in a distributed computing system. For example, the configuration setting of a configurable virtual component can be restored to a previous working configuration setting. In some embodiments, a configuration setting of a VCI and/or configurable virtual component in a distributed computing system can be restored to a previous working configuration setting in the case of an accidental change being made to one or more components in the system. In at least one embodiment, an administrator or user can audit the stored revisions to determine changes to the system in case of component failure and/or performance glitches that can occur in the system as a result of user changes to one or more components in the system, for example.

As described in more detail herein, embodiments of the present disclosure can allow for configuration, settings for configurable virtual components by receiving a plurality of discrete changes to a configuration setting of a configurable virtual component within a distributed computing system and storing information regarding each of the plurality of discrete changes to the configuration setting of the configurable virtual component. In some embodiments, a previous configuration setting of the configurable virtual component can be restored using the stored information regarding a change among the plurality of discrete changes to the configuration setting of the configurable virtual component.

FIG. 1 is a diagram of a host for configuration settings for configurable virtual components according to the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage, in some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. In some embodiments, a VCI among the number of VCIs can be a master VCI. For example, VCI 106-1 can be a master VCI, and VCIs 106-2, . . . , 106-N can be slave VCIs. The host 102 can be in communication with a configurable virtual component configuration settings system 114.

In some embodiments, a system including the configurable virtual component configuration settings system 114 can include a combination of software and hardware, or the configurable virtual component configuration settings system 114 can include software and can be provisioned by processing resource 108. An example of the configurable virtual component revision system is illustrated and described in more detail with respect to FIG. 2.

Figure 2:
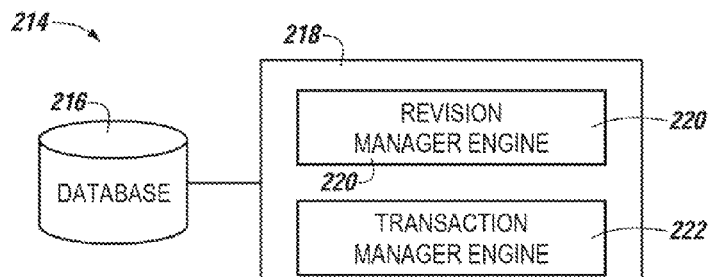
FIG. 2 is a diagram of a system with configuration settings for configurable virtual components according to the present disclosure.

FIG. 2 is a diagram of a system for configuration settings for configurable virtual components according to the present disclosure. The system 214 can include a database 216, a subsystem 218, and or a number of engines, for example revision manager engine 220, and/or transaction manager engine 222, and can be in communication with the database 216 via a communication link. The system 214 can include additional or fewer engines than illustrated to perform the various functions described herein. The system can represent executable instructions and or hardware of a machine (e.g., machine 26 as referenced in FIG. 3, etc.). As used herein, an "engine" can include executable instructions and/or hardware, but at least includes hardware. Hardware is a physical component of a machine that enables it to perform a function. Examples of hardware can include a processing resource, a memory resource, a logic gate, etc.

The number of engines can include a combination of hardware and executable instructions that is configured to perform a number of functions described herein. The executable instructions (e.g., software, firmware, etc.) can be stored in a memory resource (e.g., machine-readable medium) as well as hard-wired program (e.g., logic). Hard-wired executable instructions (e.g., logic) can be considered as both executable instructions and hardware.

In some embodiments, the revision manager engine 220 can include a combination of hardware and executable instructions that can be configured to store up to a threshold number of configuration setting changes made to the configurable virtual component. In at least one embodiment, the revision manager engine 220 can be configured to generate a respective revision identification corresponding to each change made to a configuration setting of the configurable virtual component and store the respective revision identification. In some embodiments, the revision manager engine 220 can be configured to receive a particular stored configuration setting among the threshold number of configuration setting changes from the revision manager engine and write the particular stored configuration setting to the configurable virtual component. In a least one embodiment, the particular stored configuration setting can be written to the configurable virtual component in response to a user command.

The transaction manager engine 222 can be configured to provide an adaptor to encode information associated with the configurable virtual component to one or more data types (e.g., integers, booleans, binary, arrays, characters, and/or strings) and provide the encoded information to the revision manager engine. As used herein, a "data type" is a classification identifying various types of data that determines the possible values of the data, operations that can be carried out (e.g., how values can be processed) with the data, the meaning of the data, and/or the way data values of a particular type can be stored. For example, a "string" is a data type consisting of a finite length sequence of characters (e.g., an alphanumeric string). A string can include an array of bytes that store a sequence of elements (e.g., characters). In some embodiments, the transaction manager engine 222 can be configured to provide an adaptor to decode the data type associated with the configurable virtual component and provide the decoded information associated with the configurable virtual component to the revision manager. In at least one embodiment, the adaptor configured to encode the information and the adaptor configured to decode the information can be the same adaptor; however, embodiments are not so limited, and different adaptors can be provided for encoding and decoding. As used herein, an "adaptor" provides encoding and/or decoding of objects in a distributed computing system, for example, encoding and/or decoding of information associated with configurable virtual components. In some embodiments, adapters can include a combination of software and/or hardware (e.g., a pool of computing resources), but at least include hardware configured to encode and/or decode information associated with configurable virtual components in a distributed computing system. The transaction manager engine 222 can be further configured to update a storage location associated with the distributed computing architecture with a respective revision identification corresponding to the written particular configuration setting to the configurable virtual component.

Figure 3:
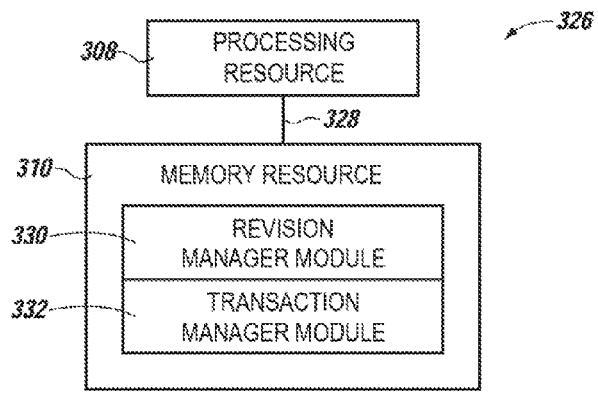
FIG. 3 is a diagram of a machine with configuration settings for configurable virtual components according to the present disclosure.

FIG. 3 is a diagram of a machine for configuration settings for configurable virtual components according to the present disclosure. The machine 326 can utilize software, hardware, firmware, and/or logic to perform a number of functions. The machine 326 can be a combination of hardware and executable instructions configured to perform a number of resources 308 and a number of memory resources 310, such as a machine-readable medium (MRM) or other memory resources 310. The memory resources 310 can be internal and/or external to the machine 326 (e.g., the machine 326 can include internal memory resources and have access to external memory resources). In some embodiments, the machine 326 can be a VCI. The executable instructions (e.g., machine-readable instructions (MRI)) can include instructions stored on the MRM to implement a particular function (e.g., an action such as providing configuration settings for configurable virtual components). The set of MRI can be executable by one or more of the processing resources 308. The memory resources 310 can be coupled to the machine 326 in a wired and/or wireless manner. For example, the memory resources 310 can be an internal memory, a portable memory, a portable disk, and/or a memory associated with another resource, e.g., enabling MRI to be transferred and/or executed across a network such as the Internet. As used herein, a "module" can include executable instructions and/or hardware, but at least includes executable instructions.

Memory resources 310 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 308 can be coupled to the memory resources 310 via a communication path 328. The communication path 328 can be local or remote to the machine 326. Examples of a local communication path 328 can include an electronic bus internal to a machine, where the memory resources 310 are in communication with the processing resources 308 via the electronic bus. Examples of such electronic buses can include Industry Standard Architecture (ISA), Peripheral Component Interconnect (PCI). Advanced Technology Attachment (ATA), Small Computer System Interface (SCSI), Universal Serial Bus (USB), among other types of electronic buses and variants thereof. The communication path 328 can be such that the memory resources 310 are remote from the processing resources 308, such as in a network connection between the memory resources 310 and the processing, resources 308. That is, the communication path 328 can be a network connection. Examples of such a network connection can include a local area network (LAN), wide area network (WAN), personal area network (PAN), and the Internet, among others.

As shown in FIG. 3, the MRI stored in the memory resources 310 can be segmented into a number of modules, for example, modules 330 and 332 that when executed by the processing resources 308 can perform a number of functions. As used herein a module includes a set of instructions included to perform a particular task or action. The number of modules 330, 332 can be sub-modules of other modules. For example, the transaction manager module 332 can be a sub-module of the revision manager module 330 and/or can be contained within a single module. Furthermore, the number of modules 330, 332 can comprise individual modules separate and distinct from one another. Examples are not limited to the specific modules 330, 332 illustrated in FIG. 3.

Each of the number of modules 330, 332 can include executable instructions and/or a combination of hardware and executable instructions that, when executed by a processing resource 308, can function as a corresponding engine as described with respect to FIG. 2. For example, the revision manager module 330 can include executable instructions and/or a combination of hardware and executable instructions that, when executed by a processing resource 308, can function as the revision manager engine 220 and/or the transaction manager module 332 can include executable instructions and/or a combination of hardware and executable instructions that, when executed by a processing resource 308, can function as the transaction manager engine 222.

Figure 4:
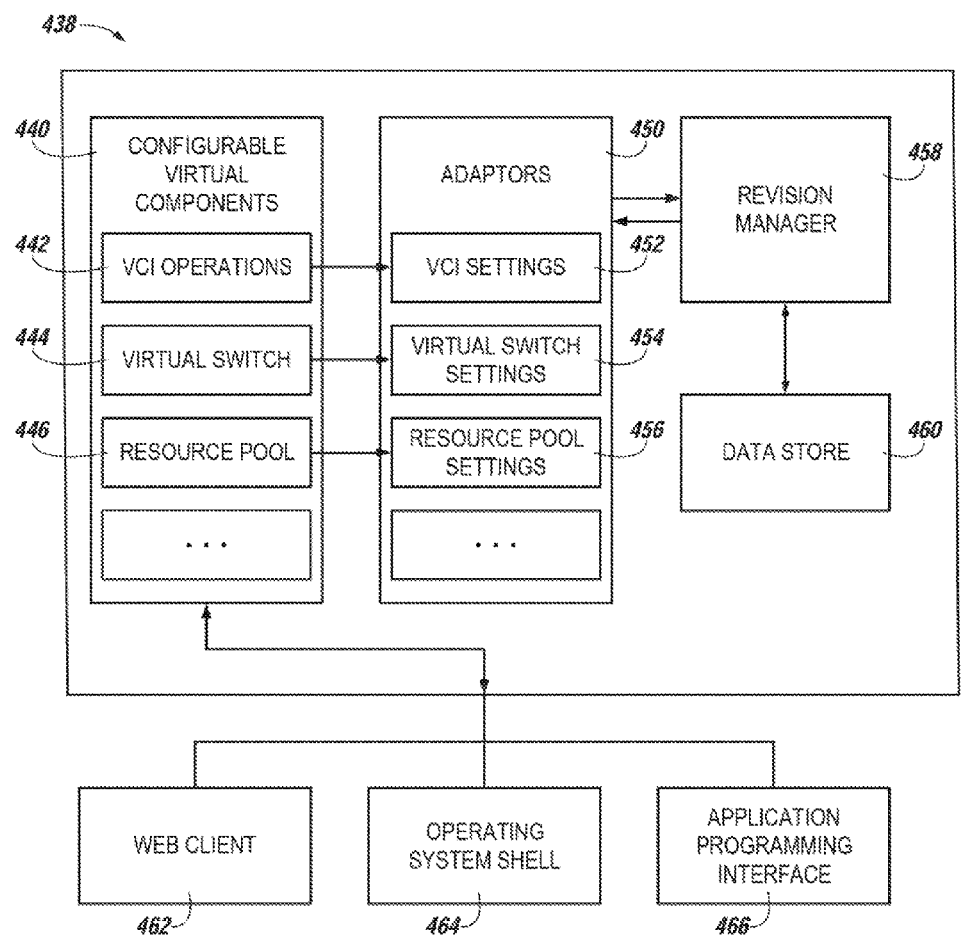
FIG. 4 is a diagram of an architecture for configuration settings for configurable virtual components according to the present disclosure.

FIG. 4 is a diagram of an architecture 438 for configuration settings for configurable virtual components according to the present disclosure. In the example of FIG. 4, the architecture 438 can include a plurality of configurable virtual components 440, a plurality of adaptors 450, a revision manager 458, and a data store 460. In at least one embodiment, the architecture 438 can be in communication with a web client 462, an operating system shell 464, and/or an application program-ling interface (API) 466.

In at least one embodiment, the plurality of configurable virtual components 440 can include one or more components configured to control VCI operations 442, one or more virtual switches 444, one or more resource pools 446, and/or other configurable virtual components, as described herein. The plurality a adaptors 450 can include VCI settings 452, virtual switch settings 454, resource pool settings 456, etc. In at least one embodiment, configurable virtual components 440 can be associated with the adaptors 450 as indicated by the arrows shown in FIG. 4. In at least one embodiment, the revision manager 458 can be configured to provide configuration settings for configurable virtual components to one or more configurable virtual components 440, as described in more detail herein.

By way of example, an administrator can request a change to one or more configurable virtual components via the web client 462 operating as system shell 464, and/or API 466. The change can be received by the adaptors 450, which can be in communication with the revision manager 458, as indicated by the arrows in FIG. 4. An adaptor (e.g., VCI settings 452, virtual switch settings 454, etc.) among the plurality of adaptors 450 can be associated with a particular configurable virtual component (e.g., VCI operations 442, virtual switch 444, etc.) among the configurable virtual components 440.

In one or more embodiments, the adaptor among the plurality of adaptors 450 can be converted to a string object (e.g., JavaScript Object Notation (JSON), Extensible Markup Language (XML), etc.). Embodiments are not so limited; however, and the adaptors 450 may not be converted to string objects. In some embodiments, the adaptor 450 associated with the configurable virtual component 440 can be provided to the revision manager 458. For example, a virtual switch settings adaptor 454 that is associated with a virtual switch configurable virtual component 440 can be provided to the revision manager 458. In at least one embodiment, the revision manager 458 can generate a unique revision identification corresponding to the change made to a configuration setting of the configurable virtual component 440. In some embodiments, the change made to a configuration setting of the configurable virtual component can be stored at the data store 460. This process can be repeated multiple times depending on the number of changes requested and/or made. In this regard, the data store 460 can store a threshold number of changes corresponding to each of a plurality of configuration settings associated with one or more of the configurable virtual components 440. Advantageously, this can allow for backup of configuration settings with assurance that a stored configuration setting among the plurality of stored configuration settings can provide a full, working environment.

In at least one embodiment, the unique revision identification can provide an indication that the change associated with the unique revision identification has been completed. For example, receipt of the unique revision identification can serve as an indication to the revision manager 458 that the requested change has been made. In some embodiments, indication that the change has been made can be provided to the user. In at least one embodiment, a previously stored change to a configuration setting of one or more of the configurable virtual components 440 can be written to, for example, overwrite a current configuration setting of the one or more configurable virtual components 440. In some embodiments, this can allow for faster provisioning, in a distributed computing architecture than some previous approaches.

Figure 5:
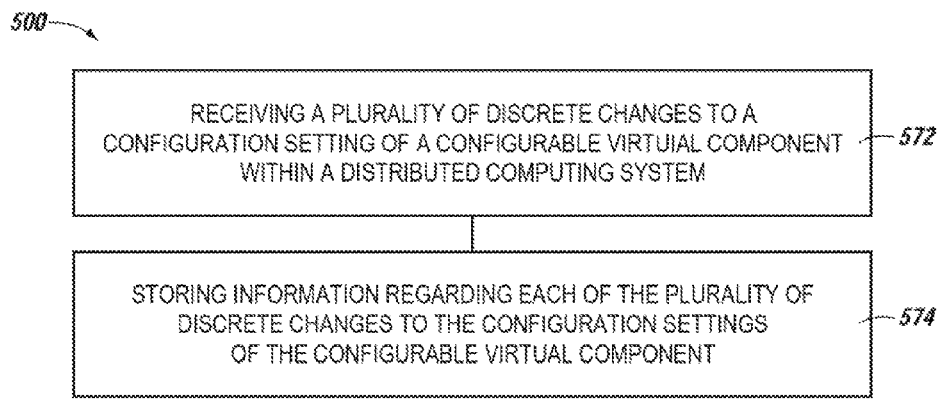
FIG. 5 is a flow chart illustrating a method for configuration settings for configurable virtual components according to the present disclosure.

FIG. 5 is a flow chart 500 illustrating a method for configuration settings for configurable virtual components according to the present disclosure. At 572, the method can include receiving a plurality of discrete changes to a configuration setting of a configurable virtual component within a distributed computing system. In at least one embodiment, the method can include generating a revision identification corresponding to each of the plurality of discrete changes to the configuration setting of the configurable virtual component and storing the revision identification. In at least one embodiment, the method can include overwriting a current configuration setting of the configurable virtual component in response to a user command, wherein overwriting the current configuration setting includes writing stored information regarding at least one of the plurality of discrete changes to the configurable virtual component based on the stored revision identification. For example, a previous stored configuration setting of the configurable virtual component can be written to the configurable virtual component to revert the configuration setting to the previously stored configuration setting of the configurable virtual component.

At 574, the method can include storing information regarding each of the plurality of discrete changes to the configuration setting of the configurable virtual component. In at least one embodiment, the method can include restoring a previous configuration setting of the configurable virtual component using the stored information regarding a change among the plurality of discrete changes to the configuration setting of the configurable virtual component. In some embodiments, the method can further include restoring the previous configuration setting of the configurable virtual component in response to a user command in at least one embodiment, the method can include storing a threshold number N of discrete changes to the configuration setting of the configurable virtual component. As an example, in at least one embodiment, the threshold number can be five; however, embodiments are not so limited, and the threshold number can be any positive, non-zero integer.

In some embodiments, providing a threshold number of previous configuration settings can allow a user to select a particular older configuration setting that worked or featured desirable characteristic, for example. In at least one embodiment, storing a threshold number of previous configuration settings can allow a user to track changes made to the configurable virtual component, and can therefore ease troubleshooting in a distributed computing system.

Figure 6:
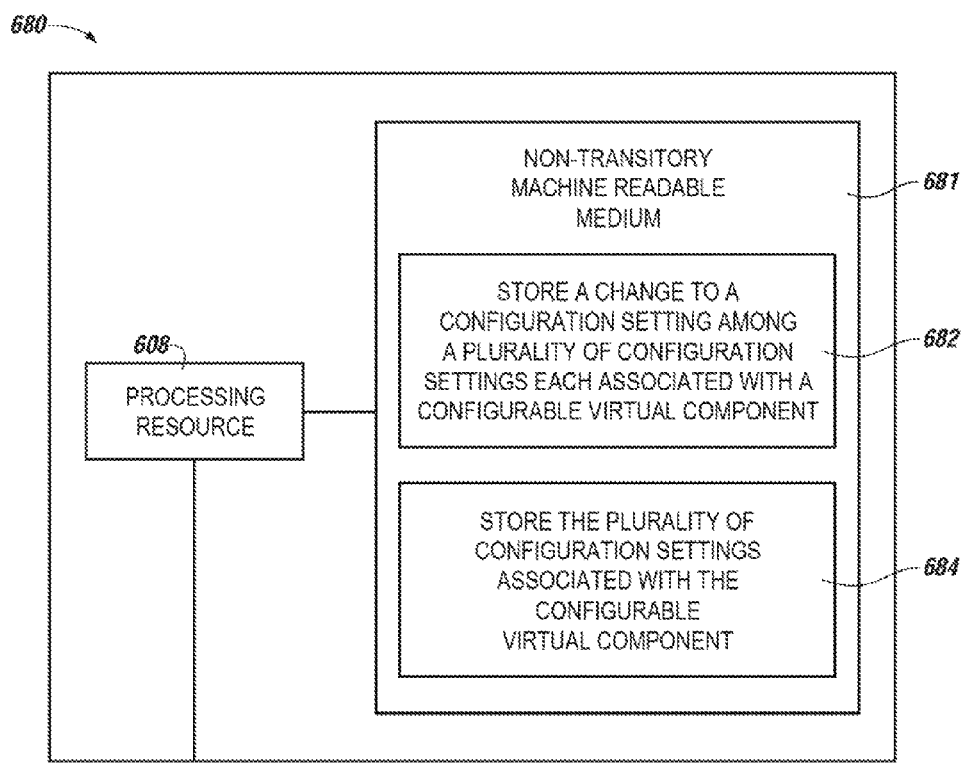
FIG. 6 is a diagram of a system including a processing resource and non-transitory computer readable medium for configuration settings for configurable virtual components according to the present disclosure.

FIG. 6 is a diagram of a system 680 including a processing resource 608 and non-transitory computer readable medium 681 for configuration settings for configurable virtual components according to the present disclosure. The processing resource 608 can be configured to execute instructions stored on the non-transitory computer readable medium 681. For example, the non-transitory computer readable medium 681 can be any type of volatile or non-volatile memory or storage, such as random access memory (RAM), flash memory, read-only memory (ROM), storage volumes, a hard disk, or a combination thereof. When executed, the instructions can cause the processing resource 608 to perform storage and/or versioning of configuration settings for configurable virtual components.

The medium 681 can store instructions 682 executable by the processing resource 608 to cause a computing system to store a change to a configuration setting among a plurality of configuration settings each associated with a configurable virtual component. The terms "executable instructions" and "software" are used interchangeably herein. In some embodiments, the medium 681 can further store instructions 684 executable by the processing resource 608 to cause a computing system to store the plurality of configuration settings associated with the configurable virtual component. The medium 681 can store instructions executable by the processing resource 608 to cause a computing system to write a particular configuration setting among the plurality of configuration settings each associated with the configurable virtual component to the configurable virtual component, update a database associated with the configurable virtual component with the unique revision identification associated with the particular configuration setting, and provide a confirmation that the configurable virtual component is operating according to the particular configuration setting.

In at least one embodiment, the medium 681 can store instructions executable by the processing resource 608 to cause a computing system to assign a unique revision identification to the change to the configuration setting of the configurable virtual component and store the unique revision identification. In some embodiments, the medium 681 can store instructions executable by the processing resource 608 to cause a computing system to store the change to the configuration setting among the plurality of configuration settings each associated with the configurable virtual component and store the plurality of configuration settings associated with the configurable virtual component to a pool of computing resources associated with a distributed computing system.

In some embodiments, the medium 681 can store instructions executable by the processing resource 608 to cause a computing system to write a stored configuration setting among the plurality of stored configuration settings associated with the configurable virtual component to the configurable virtual component. In some embodiments, the medium 681 can store instructions executable by the processing resource 608 to cause a computing system to provide a confirmation that the stored configuration setting among the plurality of stored configuration settings associated with the configurable virtual component has been written to the configurable virtual component.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A non-transitory machine-readable medium storing instructions executable by a processing resource to cause a computing system to:
    store up to a threshold number of changes to a configuration setting among a plurality of configuration settings each associated with a configurable virtual component;
    store, by a revision manager engine, the plurality of configuration settings associated with the configurable virtual component;
    cause an adaptor associated with the revision manager engine to decode a data type associated with the configurable virtual component;
    cause the decoded information associated with the configurable component to be transferred to and stored by the revision manager engine;
    restore a stored configuration setting among the plurality of stored configuration settings associated with the configurable virtual component to the configurable virtual component; and
    operate the configurable component using the restored configuration setting.

2. The non-transitory machine-readable medium of claim 1, wherein the instructions are configured to cause the processing resource to:
    assign a unique revision identification to the change to the configuration setting of the configurable virtual component; and
    store the unique revision identification.

3. The non-transitory machine-readable medium of claim 2, wherein the instructions are configured to cause the processing resource to:
    write a particular configuration setting among the plurality of configuration settings each associated with the configurable virtual component to the configurable virtual component;
    update a database associated with the configurable virtual component with the unique revision identification associated with the particular configuration setting; and
    provide a confirmation that the configurable virtual component is operating according to the particular configuration setting.

4. The non-transitory machine-readable medium of claim 1, wherein the instructions are configured to cause the processing resource to store the change to the configuration setting among the plurality of configuration settings each associated with the configurable virtual component and store the plurality of configuration settings associated with the configurable virtual component to a pool of computing resources associated with a distributed computing system.

5. The non-transitory machine-readable medium of claim 1, wherein the instructions are configured to cause the processing resource to provide a confirmation that the stored configuration setting among the plurality of stored configuration settings associated with the configurable virtual component has been written to the configurable virtual component.

6. A system, comprising:
    a configurable virtual component associated with a distributed computing architecture;
    a revision manager engine configured to store information associated with an adaptor associated with the configurable virtual component, wherein the revision manager engine is configured to:
        store up to a threshold number of configuration changes made to the configurable virtual component;
        provide an adaptor to decode the data type associated with the configurable virtual component;
        provide the decoded information associated with the configurable virtual component to the revision manager engine; and
    a transaction manager engine configured to:
        provide an adaptor to encode information associated with the configurable virtual component to a data type;
        provide the encoded information to the revision manager engine;
        receive a particular stored configuration among the threshold number of configuration changes from the revision manager engine;
        write the particular stored configuration to the configurable virtual component; and
        operate the configurable virtual component using the particular stored configuration.

7. The system of claim 6, wherein the revision manager engine is configured to:
    generate a respective revision identification corresponding to each change made to the configurable virtual component; and
    store the respective revision identification.

8. The system of claim 6, wherein the transaction manager is configured to update a storage location associated with the distributed computing architecture with a respective revision identification corresponding to the written particular configuration to the configurable virtual component.

9. The system of claim 6, wherein the particular stored configuration is written in response to a user command.

10. A method, comprising:
receiving, by a revision manager engine, a plurality of discrete changes to a configuration setting of a configurable virtual component within a distributed computing system;
storing, by the revision manager engine, a threshold number of configuration changes regarding each of the plurality of discrete changes to the configuration setting of the configurable virtual component;
providing, by the revision manager engine, an adaptor to decode a data type associated with the configurable virtual component, wherein the adaptor is associated with the configurable virtual component;
providing the decoded information associated with the configurable virtual component to the revision manager engine, wherein the revision manager engine is configured to store information associated with the adaptor;
restoring a previous configuration setting of the configurable virtual component using the stored information regarding a change among the plurality of discrete changes to the configuration setting of the configurable virtual component; and
operating the configurable virtual component using the restored configuration setting.

11. The method of claim 10, comprising restoring the previous configuration setting of the configurable virtual component in response to a user command.

12. The method of claim 10, comprising:
generating a revision identification corresponding to each of the plurality of discrete changes to the configuration setting of the configurable virtual component; and
storing the revision identification.

13. The method of claim 12, comprising:
overwriting a current configuration setting of the configurable virtual component in response to a user command, wherein overwriting the current configuration setting includes writing stored information regarding at least one of the plurality of discrete changes to the configurable virtual component based on the stored revision identification.

14. The method of claim 10, comprising storing a threshold number N of discrete changes to the configuration setting of the configurable virtual component.

15. The method of claim 14, wherein the threshold number is five.

* * * * *